United States Patent
Vorotnikov et al.

(10) Patent No.: US 12,001,860 B1
(45) Date of Patent: Jun. 4, 2024

(54) METHODS AND APPARATUS TO GENERATE CODE AS A PLUG-IN IN A CLOUD COMPUTING ENVIRONMENT

(71) Applicant: VMware LLC, Palo Alto, CA (US)

(72) Inventors: Petar Vorotnikov, Sofia (BG); Petko Marinov, Sofia (BG)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/160,463

(22) Filed: Jan. 27, 2023

(51) Int. Cl.
*G06F 9/445* (2018.01)

(52) U.S. Cl.
CPC ...... *G06F 9/44526* (2013.01); *G06F 9/44589* (2013.01)

(58) Field of Classification Search
None
See application file for complete search history.

(56) References Cited

U.S. PATENT DOCUMENTS

| | | | | |
|---|---|---|---|---|
| 2013/0042239 A1* | 2/2013 | Mousseau | | G06F 8/34 718/1 |
| 2019/0205120 A1* | 7/2019 | Sheedy | | G06F 8/656 |
| 2021/0173846 A1* | 6/2021 | Verma | | G06F 16/283 |
| 2022/0129798 A1* | 4/2022 | Chintalapati | | G06Q 10/067 |
| 2023/0102795 A1* | 3/2023 | Zhu | | G06F 9/4856 718/102 |

OTHER PUBLICATIONS

Sandobalin et al., "An Infrastructure Modelling Tool for Cloud Provisioning," dated Jun. 2017, accessed from https://www.researchgate.net/publication/316701858, 9 pages.

* cited by examiner

*Primary Examiner* — Philip Wang
(74) *Attorney, Agent, or Firm* — Quarles & Brady LLP

(57) ABSTRACT

Methods, apparatus, systems, and articles of manufacture are disclosed to generate code as a plug-in in a cloud computing environment. An example system includes at least one memory, programmable circuitry, and machine readable instructions to program the programmable circuitry to introspect code in a library to obtain introspection data, the library corresponding to a resource that is to be deployed in a cloud infrastructure environment, generate a model based on the introspection data, the model to be a representation of the resource, cross-reference the model with a resource meta-model, the resource meta-model to map characteristics of the resource represented by the model to an actual state of the resource, and generate a plug-in based on the cross-referenced model.

20 Claims, 9 Drawing Sheets

METHODS AND APPARATUS TO GENERATE CODE AS A PLUG-IN IN A CLOUD COMPUTING ENVIRONMENT

FIELD OF THE DISCLOSURE

This disclosure relates generally to cloud computing and, more particularly, to methods and apparatus to generate code as a plug-in in a cloud computing environment.

BACKGROUND

Cloud environments are sometimes used to execute workloads. Such workloads can be executed using cloud applications. Cloud applications are a collection of compute resources that are coupled by a cloud network. Compute resources are virtual computer systems that are capable of providing computing services. Cloud networks allow cloud applications to create, read, update, and delete resources. Some resources include or are used to implement cloud applications.

BRIEF DESCRIPTION OF THE DRAWINGS

FIG. 4, are flowcharts representative of example machine readable instructions and/or example operations that may be executed by example processor circuitry to implement the plug-in generation circuitry of FIGS. 1 and 2.

In general, the same reference numbers will be used throughout the drawing(s) and accompanying written description to refer to the same or like parts. The figures are not to scale.

Figure 1:
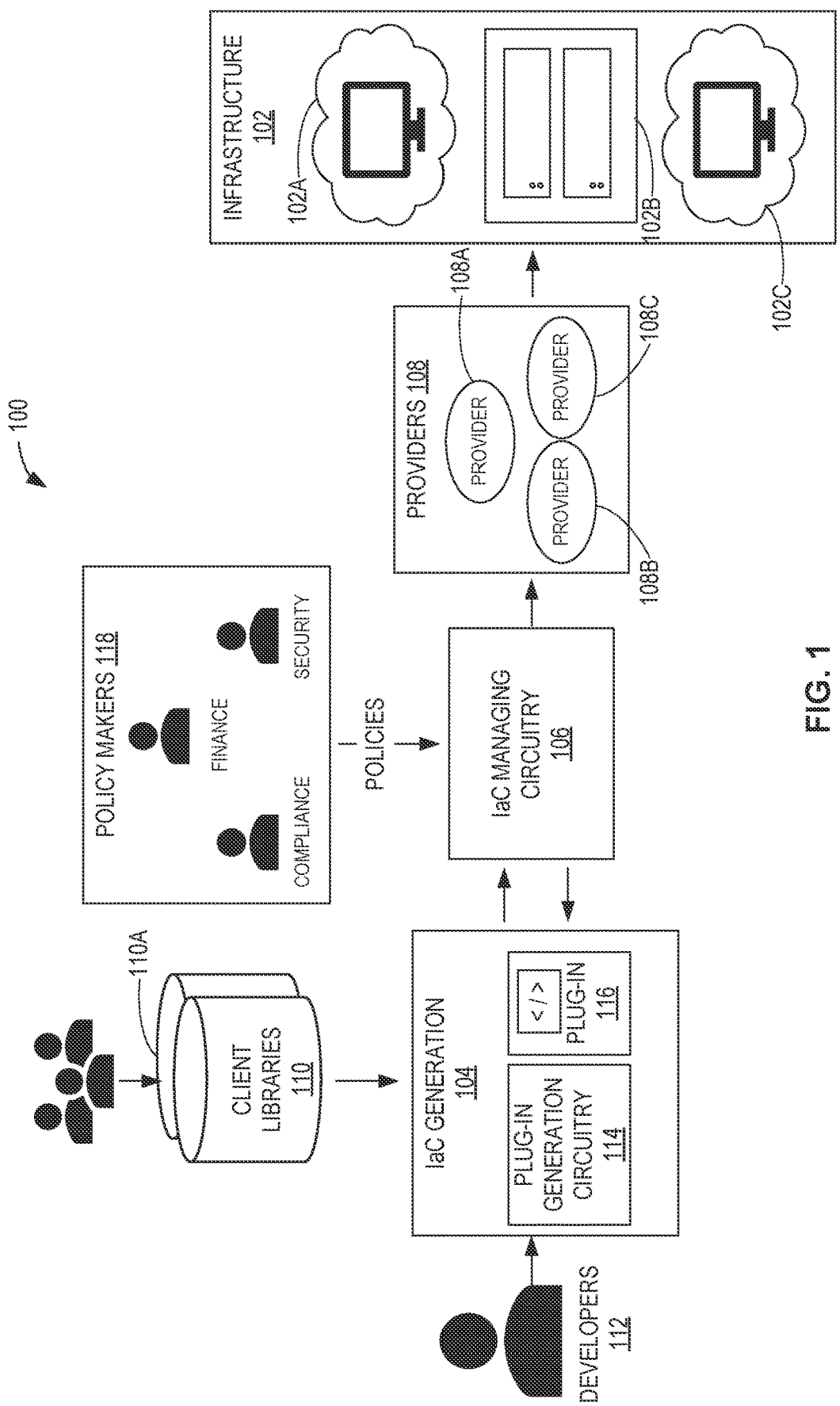
FIG. 1 is an example infrastructure as code (IaC) system to generate and deploy example cloud infrastructure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Examples disclosed herein generate code that can be used to add to, extend, adjust, or create resources in a cloud infrastructure. For example, examples disclosed herein generate a plug-in that can be plugged into any cloud provisioning platform, such as an IaC system.

IaC is a key component in facilitating, managing, and operating cloud environments. For example, cloud-based infrastructure, such as components needed for cloud computing (e.g., hardware, virtualized resources, storage, network resources, etc.), used to be created and/or generated through hardware and manual processes. For example, developers generated the cloud infrastructure by manually designing the architecture (e.g., components of the cloud infrastructure and how the components would interact or operate) of the cloud-based infrastructure on paper and then manually creating scripts (e.g., a file including specific commands that run for a particular infrastructure component) for each of the design components. However, IaC eliminates those manual requirements by automating the process of generating and updating cloud infrastructure.

IaC is a system that provides the ability to define infrastructure in the cloud by writing code, rather than deploying or making changes to the infrastructure manually. For example, the IaC system describes a desired state of a resource in cloud infrastructure using declarative expression or description (e.g., declarative programming). In some examples, IaC provides a mechanism to enforce (e.g., deploy, interpret, remove, mutate, etc.) the desired state against the infrastructure (e.g., to translate the desired state into an actual state of the resource). A desired state of a resource is a listing of the properties of the resource and the desired values of the properties. The properties of a resource are defined in its resource type schema. The properties of a resource type scheme include whether the property is required, valid values, and other property constraints. For example, a log group resource may be created to document metrics of an application. In some examples, the properties of the log group resource include a specific name and a retention policy (e.g., 10 days, 50 days, 90 days, etc.). The desired state of the log group resource is the given and/or specific log group name and the specified retention policy.

In some examples, developers and/or users of IaC utilize IaC tools to manage infrastructure in a plurality of cloud provisioning platforms. Such tools allow developers and/or users to manage infrastructure with configuration files (e.g., human-readable, declarative language files used to configure parameters, settings, and/or states of infrastructure components) rather than manually through a graphical user interface (GUI). In some examples, developers and/or users create plug-ins that enable the IaC tools to interact with the plurality of cloud provisioning platforms. In such examples, the plug-ins interact with the plurality of cloud provisioning platforms via application programing interfaces (APIs).

Designing and implementing plug-ins for IaC comes with a plurality of challenges. For example, plug-ins are designed to facilitate API interactions and expose infrastructure resources. As such, the plug-ins need to comply with contracts corresponding to the IaC system and contracts/policies corresponding to the API that is to create, read, update, and/or delete infrastructure. In some examples, contracts related to the IaC system may include licensing terms, policy terms, requirements for the infrastructure component(s), service level agreement (SLA), etc. In order to comply with such contracts, designers and/or developers of the plug-ins must have knowledge and/or familiarity with the contract(s) imposed by the IaC system. Such knowledge and/or familiarity is not easily attainable.

Other challenges posed include implementing a representational state transfer (REST) API consumption layer for the plug-in. A REST API is an interface that two computing systems (e.g., virtual computing systems, cloud computing systems, hardware computing systems, etc.) use to exchange information securely over a network (e.g., the Internet). In some examples, applications have to communicate with other internal and third-party applications to perform various tasks. For example, to generate monthly pay slips, an internal accounts system for a business entity may have to share data with a customer's banking system to automate invoicing and communicate with an internal timesheet application. REST APIs support this information exchange because the REST APIs follow secure, reliable, and efficient software communication standards.

The challenge related to implementing a REST API consumption layer for the plug-in is related to possessing a familiarity and knowledge of the definition of the REST API. For example, developers of the plug-in have to know a standard format that the REST API uses to transfer information and how to request information from the REST API. Additionally, the consumption and/or calling of any REST API through already generated client libraries imposes the requirement for understanding consumption details around the client library.

Therefore, developers require time, effort, and additional knowledge, with respect to the knowledge needed to build and design cloud infrastructure, in order to generate plug-ins for IaC systems. These factors (e.g., time, effort, and additional knowledge) introduce human error to the implementation process of cloud infrastructure. Examples disclosed herein correct human error related to implementing cloud infrastructure by providing domain-specific code as a plug-in to an existing IaC system. In examples disclosed herein, the example plug-in is based on previously generated client libraries, such as open source libraries having set(s) of rules, specifications, and tools related to resource provisioning, and resource meta-models.

FIG. 1 is an example IaC system 100 to generate and deploy example cloud infrastructure 102. The example IaC system 100 includes example IaC generation circuitry 104, example IaC managing circuitry 106, example resource providers 108, and example client libraries 110.

In FIG. 1, the example IaC system 100 may be employed by an example business entity that runs one or more operations including multiple different parts. For example, a business entity that provides online shopping services to customers may run a plurality of different projects and services to keep the website updated, modern, and secure. In order to develop and test the different services, a plurality of teams are hired, each working independently of each other but whose job requires an understanding of the dependencies in the software developed for all of the online shopping services. Such example teams utilize the example IaC system 100 to create an environment (e.g., the cloud infrastructure 102) that enables them to test and deploy their services (e.g., projects, updates, etc.).

In FIG. 1, the example IaC system 100 includes the example cloud infrastructure 102 to enable developers to test and deploy their applications. As used herein, cloud infrastructure is a term used to describe the components needed for cloud computing, which includes hardware, virtualized resources, and network resources. For example, the cloud infrastructure 102 includes virtual machines (VMs), data centers (e.g., software defined datacenters (SDDC)), a virtual private cloud (VPC), and/or any other resources that are utilized to build a cloud and host services and applications. In the example IaC system 100, the cloud infrastructure 102 is an existing cloud infrastructure than can be added onto and/or updated.

In FIG. 1, the example IaC system 100 includes the example IaC generation circuitry 104 to generate the code utilized to build the example cloud infrastructure 102. For example, the IaC generation circuitry 104 obtains instructions from example developer(s) 112 to create and/or update the example cloud infrastructure 102 and generates code that is used by IaC managing circuitry 106 to create and/or update the cloud infrastructure 102. In some examples, the IaC generation circuitry 104 generates plug-ins that can be utilized by developer(s) 112 to build cloud infrastructure 102. In such an example, the IaC generation circuitry 104 utilizes code and/or information from the example client libraries 110 to generate the code. The example IaC generation circuitry 104 includes example plug-in generation circuitry 114 and an example plug-in 116.

In FIG. 1, the example plug-in generation circuitry 114 generates the example plug-in 116 to enable an extension of the cloud infrastructure 102 and the IaC managing circuitry 106. The example plug-in generation circuitry 114 is described in further detail below in connection with FIG. 2.

In FIG. 1, the example IaC system 100 includes the example IaC managing circuitry 106 to use the code generated by the IaC generation circuitry 104 to generate cloud infrastructure 102. For example, the IaC managing circuitry 106 consumes the plug-in 116 and builds out and/or updates the example cloud infrastructure 102. The terms "consume" and "consuming" refer to the process of initiating the functions in code, such as calling or using an API to perform an operation specified in the code. In some examples, the IaC managing circuitry 106 understands API interactions between resources (e.g., components of the cloud infrastructure 102) and their corresponding providers (e.g., resource providers 108). For example, the IaC managing circuitry 106 obtains code from a module, plug-in, and/or human-readable file and can determine how to interact with resource providers 108 in order to create and/or add resources for the cloud infrastructure 102. In some examples, the IaC managing circuitry 106 can determine how to interact with resource providers 108 to create, read, update, or delete resources based on the code in the plug-in 116. In such an example, the IaC managing circuitry 106 efficiently creates resources in the cloud infrastructure 102 based on the accurately generated code represented by the plug-in 116.

In some examples, the IaC managing circuitry 106 complies with policies defined by example policy makers 118. For example, policy makers 118 define security policies, software compliance policies, finance policies, etc., that are to be applied to applications and cloud infrastructure. In some examples, security policies may include accessibility to the cloud infrastructure 102, password requirements, etc. In some examples, compliance policies include service-level agreements (SLAs), regulatory standards that need to be met by the cloud infrastructure 102, etc. In some examples, a finance policy includes how the business entity wants to capitalize on costs associated with implementing cloud infrastructure 102. The example IaC managing circuitry 106 applies these policies when creating the cloud infrastructure 102.

In FIG. 1, the example IaC system 100 includes example resource providers 108 to facilitate the generation of resources in the example cloud infrastructure 102. For example, the resource providers 108 are software development companies that provide cloud services, such as cloud management services and cloud provisioning services. Examples of providers includes VMware Inc., Amazon® Web Services (AWS), Kubernetes, Heroku, etc. The example providers 108 include an example first provider 108A, an example second provider 108B, and an example third provider 108C. In some examples, the first provider 108A provides services to create, manage, and update the first example resource 102A. In some examples, the second provider 108B provides services to create, manage, and update the second example resource 102B. In some examples, the third provider 108C provides services to create, manage, and update the third example resource 102C. The example resource providers 108 can include any number of providers to generate any number of resources.

In FIG. 1, the example IaC system 100 includes the example client libraries 110 to store executable code generated based on API definitions. In some examples, the client libraries 110 include client library 110A. In some examples, the executable code is generated based on descriptions of resource configurations and/or resource states, descriptions of existing resources in the example cloud infrastructure 102, etc. Such descriptions are obtained from open-source files associated with the resource.

In some examples, the client library 110 is a public repository including open source files and/or documents specifying a list of resources available in a REST API, operations that can be called on those resources, and corresponding parameters required for those operations. In some examples, the client libraries 110 are private repositories for internal use only. For example, the client library 110A may store previously generated descriptions associated with existing APIs and resources in the cloud infrastructure 102. In some examples, the client libraries 110 are private repositories including both open source documents and/or files as well as previously generated plug-ins. For example, a business entity developing a closed source project utilizes publicly available documents and customizes them based on the project. Additionally, a private client library (e.g., client library 110A) provides a plurality of different teams the ability to delegate ownership of defining and provisioning the resources they need in the cloud infrastructure 102.

In some examples, IaC generation circuitry 104 queries the client libraries 110 to generate code as a plug-in. For example, the plug-in generation circuitry 114 obtains executable code from the client library 110A to generate the plug-in 116.

Figure 2:
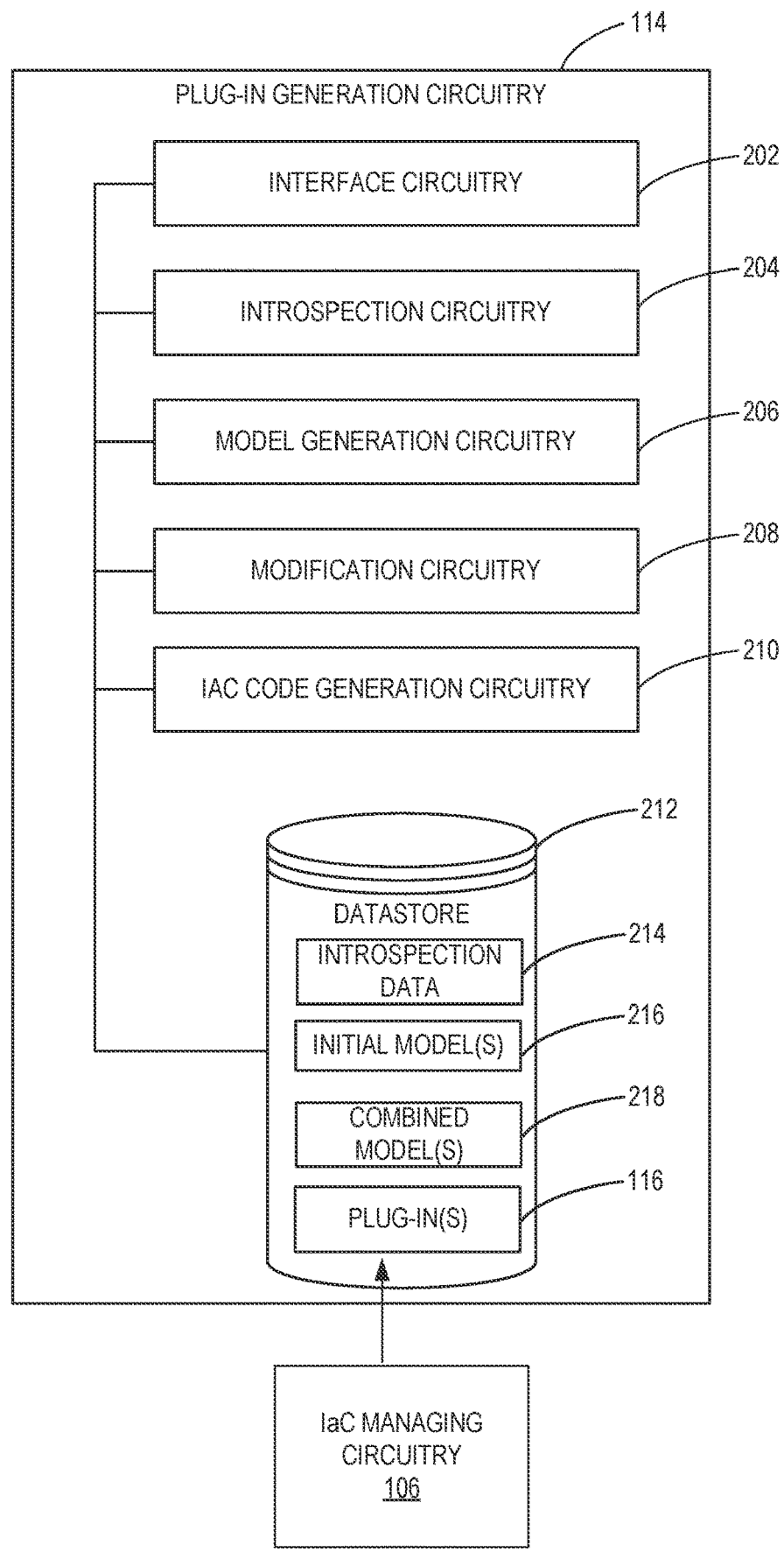
FIG. 2 is a block diagram of example plug-in generation circuitry to generate code as a plug-in for the example IaC system.

FIG. 2 is a block diagram of the example plug-in generation circuitry 114 of FIG. 1 to generate example code as a plug-in for IaC managing circuitry 106. The example plug-in generation circuitry 114 of FIG. 2 may be instantiated (e.g., creating an instance of, bring into being for any length of time, materialize, implement, etc.) by processor circuitry such as a central processing unit executing instructions. Additionally or alternatively, the example plug-in generation circuitry 114 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example plug-in generation circuitry 114 includes example interface circuitry 202, example introspection circuitry 204, example model generation circuitry 206, example modification circuitry 208, example IaC code generation circuitry 210, and an example datastore 212. In some examples, the interface circuitry 202 is instantiated by processor circuitry executing interface circuitry 202 instructions and/or configured to perform operations such as those represented by the flowchart of FIG. 4. In some examples, the example introspection circuitry 204 is instantiated by processor circuitry executing example introspection circuitry 204 instructions and/or configured to perform operations such as those represented by the flowchart of FIGS. 4A and 4B. In some examples, the example model generation circuitry 206 is instantiated by processor circuitry executing example model generation circuitry 206 instructions and/or configured to perform operations such as those represented by the flowchart of FIGS. 4A and 4B. In some examples, the example modification circuitry 208 is instantiated by processor circuitry executing example modification circuitry 208 instructions and/or configured to perform operations such as those represented by the flowchart of FIGS. 4A and 4B. In some examples, the example IaC code generation circuitry 210 is instantiated by processor circuitry executing example IaC code generation circuitry 210 instructions and/or configured to perform operations such as those represented by the flowchart of FIGS. 4A and 4B.

In FIG. 2, the example plug-in generation circuitry 114 includes the example interface circuitry 202 to obtain developer instructions. In some examples, the interface circuitry 202 obtains instructions from example developers (e.g., example developers 112 of FIG. 1) indicative of desired resources. For example, the interface circuitry 202 obtains an instruction requesting the generation of a VM plug-in. In such an example, the developers are requesting a the generation of a plug-in that will provide subsequent application developers, users of a cloud environment, etc., an auto-generation of a virtual machine.

In some examples, the interface circuitry 202 communicates with open source programs. For example, the interface circuitry 202 is utilized to communicate between the example introspection circuitry 204, the example model generation circuitry 206, the example modification circuitry 208, and/or the example IaC code generation circuitry 210 and open source programs. In some examples, the interface circuitry 202 is utilized by the introspection circuitry 204 to communicate with an example library including open source executable code. In some examples, the interface circuitry 202 is utilized by the model generation circuitry 206 to communicate with programs providing open source files. In some examples, the interface circuitry 202 is utilized by the modification circuitry 208 to communicate with developers (e.g., the developers 112 of FIG. 1). In some examples, the interface circuitry 202 is utilized by the IaC code generation circuitry 210 to communicate with an IaC managing system (e.g., the IaC managing circuitry 106 of FIG. 1).

In some examples, the interface circuitry 202 includes means for obtaining requests to generate a resource as infrastructure as code. For example, the means for obtaining requests to generate a resource as infrastructure as code may be implemented by interface circuitry 202. In some examples, the interface circuitry 202 may be instantiated by processor circuitry such as the example processor circuitry 512 of FIG. 5. For instance, the interface circuitry 202 may be instantiated by the example microprocessor 600 of FIG. 6 executing machine executable instructions such as those implemented by at least block 402 of FIG. 4A. In some examples, the interface circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the interface circuitry 202 may be instantiated by any other combination of hardware, software, and/or firmware. For example, the interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example plug-in generation circuitry 114 includes the example introspection circuitry 204 to introspect at least one open source library. An open source library (e.g., such as client libraries 110 of FIG. 1) includes executable code. In some examples, the at least one library is a language-specific client library, generated based on a formal API definition. For example, an open source code generator (not depicted) may generate a language-specific library based on the definition of any API (e.g., a Kubernetes® API, an Amazon® Web Services API, a VMware® API, etc.). A definition of an API includes information indicative of how to connect to the API, how to obtain data from the API, policies and parameters of the API, etc. A language-specific library is defined as a library including executable code written in a specific language. For example, a first library includes executable code, written in Java®, corresponding to an API and a second client library includes executable code, written in Scala, corresponding to the API. In some examples, the language-specific libraries are robust because they are generated based on open source definitions (e.g., open source configuration files such as Swagger Files). Such open source definitions are developed by a community of developers and contributors. For example, code (e.g., the executable code) included in the library is well-maintained, well-documented, and well-supported because of the community of developers who have contributed to its generation.

The example introspection circuitry 204 introspects the open source library to extract characteristics of the executable code. As used herein, introspection refers to examining classes, functions, and keywords of code to understand how the code works, what the classes, functions, and keywords do, and what APIs the classes, functions, and keywords call on for operation. For example, the introspection circuitry 204 analyzes the type, properties, and other characteristics of objects, functions, and modules at runtime to determine the characteristics of the code in the library. As used herein, a "module," a "data structure," and a "record" is a file encapsulating infrastructure resources into a reusable format. For example, a module includes a description of resources and resource configurations in an environment.

In some examples, the introspection circuitry 204 introspects an open source library based on the type of language of the code in the library. For example, the process for introspecting code may be different for each programming language. In some examples, the introspection circuitry 204 may utilize a different process to examine types and properties of code written in Python versus code written in Java. The example introspection circuitry 204 introspects any type of language-specific code. For example, the introspection circuitry 204 implements a tree traversal algorithm to allow procedural code processing of any language-specific code. A tree traversal algorithm is a process including constructing a tree (e.g., a data structure) based on the code and traversing the tree to determine types, properties, characteristics, parameters, etc., of the code. Procedural code processing refers to determining of the types, properties, characteristics, parameters, of the code in a procedural manner. For example, when the introspection circuitry 204 traverses the tree (e.g., the data structure corresponding to the code in the open source library), the introspection circuitry 204 first analyzes a root node (e.g., the top node in a tree), then follows an order down the tree to other nodes. As used herein, a node is a structure which may contain a value, a condition, or represent a separate data structure. In some examples, the introspection circuitry 204 utilizes relationships between nodes to generate introspection data 214.

In some examples, when the introspection circuitry 204 introspects the library, the introspection circuitry 204 identifies syntax errors in the code. For example, when runtime errors occur while the introspection circuitry 204 is processing and analyzing the executable code, the introspection circuitry 204 determines the code is not accurately defined. In some examples, the code may have incorrect descriptions in the open source files and, thus, such erroneous descriptions translate into the executable code of the open source libraries. For example, the introspection circuitry 204 identifies inconsistencies in the definition, duplicates in the parameters, inconsistencies in the authentication schema, etc. The example introspection circuitry 204 generates an instruction to cause the example interface circuitry 202 to notify the developer of the identified errors. In some examples, such an identification of errors prior to final IaC code generation (e.g., generation of a plug-in 116) improves the efficiency of an IaC system by avoiding errors at runtime. For example, in prior techniques, errors in API definitions and IaC code are not identified in IaC code until the code is fully developed and released.

The example introspection circuitry 204 stores introspection data 214 in the example datastore 212. In this example, introspection data 214 includes characteristics of the code in the open source libraries. For example, introspection data 214 includes descriptions of how the code in the client library works (e.g., what the classes, functions, and keywords are, what the classes, functions, and keywords do, and what the classes, functions, and keywords know). Additionally, the example introspection data 214 includes descriptions corresponding to how the resource interacts with other resources.

In some examples, the introspection circuitry 204 includes means for introspecting code in an open source library. For example, the means for introspecting code in an open source library may be implemented by introspection circuitry 204. In some examples, the introspection circuitry 204 may be instantiated by processor circuitry such as the example processor circuitry 512 of FIG. 5. For instance, the introspection circuitry 204 may be instantiated by the example microprocessor 600 of FIG. 6 executing machine executable instructions such as those implemented by at least block 406 of FIG. 4A. In some examples, the introspection circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the introspection circuitry 204 may be instantiated by any other combination of hardware, software, and/or firmware. For example, the introspection circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example plug-in generation circuitry 114 includes the example model generation circuitry 206 to generate example initial model(s) 216 based on the example introspection data 214. The example initial model(s) 216 are abstract representations of a programmatic sequence (e.g., an API call sequence) for creating, reading, updating or deleting the infrastructure definitions. This abstraction is generated by introspecting the code of the client libraries or otherwise using introspection techniques. For example, an abstract representation of the programmatic sequence is a model including only the relevant data about the API used to create, read, update, or delete a resource in order to reduce complexity. For example, the initial model(s) 216 do not include details that do not represent the API.

In some examples, the model generation circuitry 206 reads open source files to enhance the initial model(s) 216. For example, the model generation circuitry 206 reads metadata from open source files that were used to create the executable code in the open source library. In some examples, the metadata enriches and/or supplements the introspection data 214. For example, the metadata from the open source files enriches and/or supplements the introspection data 214 because the metadata may include information corresponding to connectivity parameters for an API that may not be included in the characteristics and descriptions of the executable code in the library. In some examples, the additional metadata or data is relevant in determining the proper understanding of the collected data from the introspection. As such, the example model generation circuitry 206 combines the metadata and the introspection data 214 to generate the initial model(s) 216.

In some examples, the model generation circuitry 206 cross-references the initial model(s) 216 with a resource meta-model. As used herein, a resource meta-model is a model that maps characteristics of a resource to a non-abstract or actual state of the resource. For example, the open source file(s) and the introspection data 214 define the abstract resource definition only partially. There could be resources that are not mapped one to one with the declarations in the open source file(s) and the definitions in the open source library (e.g., client library 110A of FIG. 1). For example, there could be a resource that has a state comprised of data received from multiple API calls in order to construct a full state definition of the resource. In such an example, the state including data received from multiple API calls is not obvious by just looking at the open source file(s). For example, IaC managing circuitry 106 may not be able to use a plug-in for that desired resource state that includes code generated based on just the open source file(s) and open source libraries.

Therefore, the example model generation circuitry 206 cross-references the initial model(s) 216 with the resource meta-model to add additional semantics to the resource definition in the initial model(s) 216. The resource meta-model additionally describes the different operations available for a resource (e.g., create a resource, update a resource, delete a resource, read or list of a collection of resources, etc.) and how those operations (e.g., creation, update, deletion, etc.) map to the specific implementation described by the client libraries (e.g., the client libraries 110). The resource meta-model is formally described in a machine-readable textual format. In some examples, the model generation circuitry 206 accesses resource meta-models from the example datastore 212 and/or from a private repository. For example, the plug-in generation circuitry 114 may be instantiated by a business entity and, thus, have access to updated resource meta-models.

An example resource meta-model may be representative of a VM deployed in a cloud environment. In some examples, a VM is a resource. In such an example, the resource meta-model defines the VM as a class and indicates the operations (e.g., create, read, update, remove, etc.) on the VM. In some examples, a second resource, such as a VPC, is added to the cloud environment. In such an example, a client library may include code representative of (e.g., defining, describing, etc.) the VPC and how it interacts with the VM. Therefore, the resource meta-model for the VM may be updated to include support for the VPC. The VPC may include a resource meta-model defining the operations of the VPC as well as its relation to and/or dependencies on the VM.

The example model generation circuitry 206 utilizes the resource meta-model to generate combined model(s) 218. For example, the model generation circuitry 206 cross-references the initial model 216 with a resource meta-model to produce a module (e.g., the combined model(s) 218). In some examples, the combined model(s) 218 represent the resource characteristics as well as the provisioning requirements of the resource. In some examples, the combined model(s) 218 manages a desired state enforcement, drift detection, and drift remediation of the resources imposed by the IaC system (e.g., the IaC system 100 of FIG. 1). As used herein, desired state enforcement is a condition and/or state that a developer (e.g., the developer 112 of FIG. 1) wants the cloud infrastructure (e.g., the cloud infrastructure 102 of FIG. 1) to be in. For example, the desired state enforcement is how IaC managing tools (e.g., the IaC managing circuitry 106) are to apply the IaC (e.g., plug-ins 116) to the cloud infrastructure (e.g., cloud infrastructure 102 of FIG. 1) to achieve a desired result.

As used herein, drift detection is the continuous process of detecting drift in cloud infrastructure managed by IaC (e.g., the IaC managing circuitry 106 of FIG. 1). Drift is the difference between the desired state of the infrastructure as defined in the IaC code (e.g., the plug-in 116). For example, after the IaC managing circuitry 106 transforms IaC into actual cloud infrastructure, the states defined in the IaC and the states of the actual cloud infrastructure are equal (e.g., in sync). However, over time, the actual state of the cloud infrastructure may change due to manual changes (e.g., individuals having access to the cloud infrastructure making updates), overlapping and/or conflicting IaC code (e.g., resources managed by multiple sets of IaC definition files and/or IaC plug-ins), etc. As used herein, drift remediation is the process of restoring the infrastructure to its desired state.

In some examples, the combined model(s) 218 manages drift detection and drift remediation by including drift detection logic and drift remediation logic. For example, the model generation circuitry 206 generates code (e.g., drift detection logic) that performs difference checks between the intended state of the resource and the actual state of the resource. For example, the model generation circuitry 206 generates code that uses the read and update operations defined for the resource in the resource meta-model to detect drift. The example model generation circuitry 206 then generates code that performs drift remediation. For example, the code (e.g., drift remediation logic) determines whether the resource supports updating of its state. In some examples, if the resource supports updating of its state, the code (e.g., drift remediation logic) performs a resource update operation as defined in the resource meta-model. In some examples, if the resource cannot be updated, then the code (e.g., drift remediation logic) recreates the resource. For example, the code (e.g., drift remediation logic) destroys the resource (e.g., using the delete operations on the resource as defined in the resource meta-model) and subsequently creates the resource (e.g., using the create operation on the resource as defined in the resource meta-model).

In some examples, the model generation circuitry 206 includes means for cross-referencing the model with a resource meta-model. For example, the means for cross-referencing the model with a resource meta-model may be implemented by model generation circuitry 206. In some examples, the model generation circuitry 206 may be instantiated by processor circuitry such as the example processor circuitry 512 of FIG. 5. For instance, the model generation circuitry 206 may be instantiated by the example microprocessor 600 of FIG. 6 executing machine executable instructions such as those implemented by at least blocks 408, 410, 412, 414, and 416 of FIG. 4A. In some examples, the model generation circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the model generation circuitry 206 may be instantiated by any other combination of hardware, software, and/or firmware. For example, the model generation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example plug-in generation circuitry 114 includes the example modification circuitry 208 to modify the combined model(s) 218. For example, the modification circuitry 208 provides developers (e.g., developers 112 of FIG. 1) the ability to modify the behavior of the combined model(s) 218. For example, the modification circuitry 208 performs resource overrides based on inputs from a user (e.g., a developer, an author, etc.). As used herein, a resource override is an instruction to change, or override, the desired state of the resource. For example, for a log group resource, the retention policy of 90 days can be changed to 100 days. In this example, the change in the retention policy is a resource override. In some examples, developers of the infrastructure and/or developers of an application may want to intervene in the IaC generation process. For example, the generation of code for IaC is based on the assumption that the API is organized correctly, as well as semantically accurate. However, in theory, this is not always the case. For example, not every definition of an API is up-to-date or accurate enough to generate code that will execute. In such an example, when developers identified issues with the code, developers manually intervened to modify the code and correct the errors. In some examples, regenerating code after having manually intervened with that same code the first time it was generated will overwrite manual modifications. As such, prior manual modifications are not optimal or robust and do not co-exist with auto-generation of code. Manual intervention is hard to implement and is prone to errors.

Therefore, the example modification circuitry 208 makes manual modifications (e.g., extensions of the generated code) possible by incorporating the manually created modules, classes, etc., into the auto-generation process. The example modification circuitry 208 enables a developer to run an auto-generation of a resource as many times as desired without fear of overwriting manual changes. In some examples, the modification circuitry 208 enables developers of the infrastructure to extend the behavior and/or realization of the combined model(s) 218. For example, developers may desire to provide their own implementation of the resource, rather than the implementation pre-defined. For example, a developer may request to delete and/or remove an existing first resource from the cloud infrastructure and update an existing second resource. In such an example, the combined model(s) 218 may indicate that the first resource is defined and running with specified parameters and indicate that the second resource is defined and running at a first version. In such an example, the modification circuitry 208 deletes the first resource and overrides the first version of the second resource to run at a second version. Therefore, the example modification circuitry 208 increases flexibility of the IaC system by providing the feature of modification.

In some examples, the modification circuitry 208 includes means for applying a modification to the cross-referenced model. For example, the means for applying a modification to the cross-referenced model may be implemented by modification circuitry 208. In some examples, the modification circuitry 208 may be instantiated by processor circuitry such as the example processor circuitry 512 of FIG. 5. For instance, the modification circuitry 208 may be instantiated by the example microprocessor 600 of FIG. 6 executing machine executable instructions such as those implemented by at least blocks 418 and 420 of FIGS. 4A and 4B. In some examples, the modification circuitry 208 may be instantiated by hardware logic circuitry, which may be implemented by an ASIC, XPU, or the FPGA circuitry 700 of FIG. 7 structured to perform operations corresponding to the machine readable instructions. Additionally or alternatively, the modification circuitry 208 may be instantiated by any other combination of hardware, software, and/or firmware. For example, the modification circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example plug-in generation circuitry 114 includes the example IaC code generation circuitry 210 to generate example plug-in(s) 116. The example plug-in(s) 116 are modules including the final domain-specific code to be consumed by an IaC managing system (e.g., the IaC managing circuitry 106 of FIG. 1). The example IaC code generation circuitry 210 obtains the modified combined model(s) 218 and uses the code in the modified combined model(s) 218 to generate the plug-in(s) 116. In some examples, the IaC code generation circuitry 210 produces the code in the modified combined model(s) 218 as a module or as a library. In some examples, the IaC code generation circuitry 210 generates a module and/or plug-in 116 for each resource in a cloud infrastructure. Having a module and/or plug-in for each resource that a business entity uses creates a set of predefined resources to allow others, such as different teams, to create infrastructure quickly and efficiently. The example IaC code generation circuitry 210 stores the plug-in(s) 116 in the example datastore 212 for subsequent access by example IaC managing circuitry 106.

In some examples, the IaC code generation circuitry 210 includes means for generating a plug-in. For example, the means for generating a plug-in may be implemented by IaC code generation circuitry 210. In some examples, the IaC code generation circuitry 210 may be instantiated by processor circuitry such as the example processor circuitry 512 of FIG. 5. For instance, the IaC code generation circuitry 210 may be instantiated by the example microprocessor 600 of FIG. 6 executing machine executable instructions such as those implemented by at least block 422 of FIG. 4B. In some examples, the IaC code generation circuitry 210 may be instantiated by hardware logic circuitry, which may be implemented by an ASIC, XPU, or the FPGA circuitry 700 of FIG. 7 structured to perform operations corresponding to the machine readable instructions. Additionally or alternatively, the IaC code generation circuitry 210 may be instantiated by any other combination of hardware, software, and/or firmware. For example, the IaC code generation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example plug-in generation circuitry 114 includes the example datastore 212 to store introspection data 214, initial model(s) 216, combined model(s) 218, and plug-in(s) 116. For example, the datastore 212 stores code at different stages of the plug-in generation process. In some examples, the datastore 212 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 212 can additionally or alternatively be implemented by one or more double data rate (DDR) memories, such as DDR, DDR2, DDR3, DDR4, mobile DDR (mDDR), etc. The example datastore 212 can additionally or alternatively be implemented by one or more mass storage devices such as hard disk drive(s), compact disk drive(s), digital versatile disk drive(s), solid-state disk drive(s), etc. While in the illustrated example the datastore 212 is illustrated as a single datastore, the datastore 212 can be implemented by any number and/or type(s) of datastores. Furthermore, the data stored in the datastore 212 can be in any data format such as, for example, binary data, comma delimited data, tab delimited data, structured query language (SQL) structures, etc.

Figure 3:
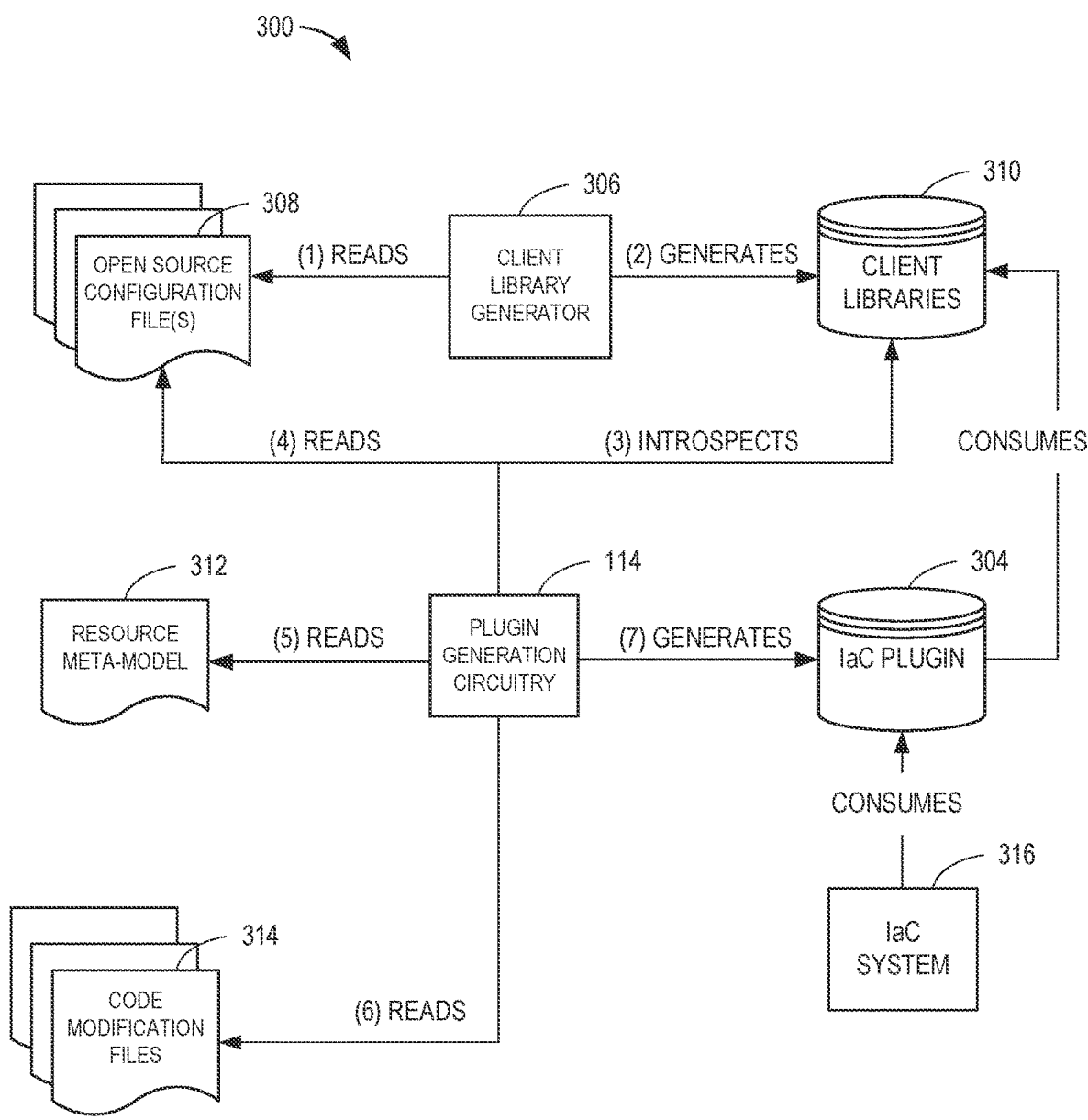
FIG. 3 is an example workflow of an example plug-in generation process.

FIG. 3 is an example workflow 300 of the plug-in generation process. The example workflow 300 illustrates interactions between example plug-in generation circuitry 114 of FIGS. 1 and 2 and external sources used to generate an example IaC plug-in 304. The example workflow 300 includes an example client library generator 306, example open source configuration file(s) 308, example client libraries 310, an example resource meta-model 312, example code modification file(s) 314, and an example IaC system 316.

The example workflow 300 begins when the example plug-in generation circuitry 114 instructs the example client library generator 306 to generate a client library 310. For example, the plug-in generation circuitry 114 may request to generate a client library 310 corresponding to a VM. The example client library generator 306 reads an open source configuration file 308 to generate the client library 310. In some examples, the open source configuration file 308 includes a formal definition of an API which can be used to produce the client library 310. The example client library 310 includes executable code for consuming the API. The example client libraries 310 of FIG. 3 may include the client libraries 110 of FIG. 1.

The example plug-in generation circuitry 114 introspects the example client library 310 to extract characteristics of executable code. For example, the plug-in generation circuitry 114 analyzes the type, properties, and other characteristics of objects, functions, and modules at runtime. In some examples, during introspection, the plug-in generation circuitry 114 identifies errors during introspection. For example, the plug-in generation circuitry 114 identifies inconsistencies in the definition, duplicates in the parameters, inconsistencies in the authentication schema, etc. If an error is identified, the example plug-in generation circuitry 114 facilitates correcting any identified errors. For example, errors are detected by the auto-generation process (e.g., by the generation of the IaC plug-in 304) by running the code in the client libraries 310. In some examples, the code execution fails with an error indicating that there are inconsistencies in the API schema or the formal API definition. The example plug-in generation circuitry 114 raises a flag to the developer that the API definition is wrong and requires manual intervention to fix.

The example plug-in generation circuitry 114 reads the definitions from the example open source configuration files 308 to enhance the data obtained from introspection. For example, the plug-in generation circuitry 114 reads metadata from open source configuration files 308 that were used create the executable code in the client libraries 310. In some examples, the plug-in generation circuitry 114 uses the data from introspection and the metadata from the open source configuration files 308 to generate a model of IaC code.

The example plug-in generation circuitry 114 then reads data from an example resource meta-model 312. For example, the plug-in generation circuitry 114 cross-references the model of IaC code (e.g., data obtained from introspection and the metadata obtained from the open source configuration files 308) to add additional semantics to the resource definition in the model of IaC code. The example plug-in generation circuitry 114 may update the model of IaC code to include support for the non-abstract states of the resources. Additionally, in some examples, the plug-in generation circuitry 114 updates the states of any related resources in the model to ensure that the requested resource complies with requirements of the cloud environment. Additionally, the example plug-in generation circuitry 114 updates the model of IaC code based on the example resource meta-model 312 to correct any drift that has occurred between the actual state of the resources and the desired state.

Next, the example plug-in generation circuitry 114 reads example code modification files 314. For example, the plug-in generation circuitry 114 determines whether any resource overrides have been requested. In such an example, the plug-in generation circuitry 114 may apply the resource overrides to the model of IaC code. For example, the plug-in generation circuitry 114 may override a state of one of the resources, may change parameters of a resource, etc. In some examples, the plug-in generation circuitry 114 determines that no code modification file(s) 314 exist and that the model of IaC code is ready to produce as the IaC plug-in 304.

The example plug-in generation circuitry 114 generates the example IaC plug-in 304. For example, the plug-in generation circuitry 114 finalizes the model of IaC code and produces the model as an IaC plug-in 304. The example plug-in generation circuitry 114 tags and/or flags the IaC plug-in 304 as finalized to inform the example IaC system 316 that code in the IaC plug-in 304 is ready to be consumed.

The example IaC system 316 installs the example IaC plug-in 304. For example, the IaC system 316 adds and/or copies the IaC plug-in 304 in order for the IaC plug-in 304 to be accessible. The example IaC system 316 then consumes the example IaC plug-in 304. For example, the IaC system 316 processes the IaC plug-in 304 to generate the desired cloud infrastructure.

In some examples, this workflow 300 can be repeated any time a developer, user, author, etc., requests a new resource that does not have a corresponding plug-in. For example, the plug-ins (e.g., such as plug-in 304) are reusable. Having such reusable code for generating cloud infrastructure increases the efficiency of developing applications. For example, when developers and teams are running, testing, and/or implementing applications, application updates, etc., they use cloud infrastructure to do that. Each time that they want to test their application, the developers and teams have to generate a cloud environment that can test such an application. As such, developers and teams request and deploy resources needed to execute the application in the cloud environment. When code is already available for a resource in a particular cloud environment, the developers and teams can almost immediately start to execute, test, update their application. Therefore, the example plug-in generation circuitry 114 improves the efficiency of implementing applications and/or services.

While an example manner of implementing the plug-in generation circuitry 114 of FIGS. 1 and 3 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example introspection circuitry 204, the example model generation circuitry 206, the example modification circuitry 208, the example IaC code generation circuitry 210, the example datastore 212, and/or, more generally, the example plug-in generation circuitry 114 of FIGS. 1 and 3, may be implemented by hardware alone or by hardware in combination with software and/or firmware. Thus, for example, any of the example interface circuitry 202, the example introspection circuitry 204, the example model generation circuitry 206, the example modification circuitry 208, the example IaC code generation circuitry 210, the example datastore 212, and/or, more generally, the example plug-in generation circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example plug-in generation circuitry 114 of FIGS. 1-3 may include one or more elements, processes, and/or devices in addition to, or instead of, those illustrated in FIG. 2, and/or may include more than one of any or all of the illustrated elements, processes and devices.

Figure 4A:
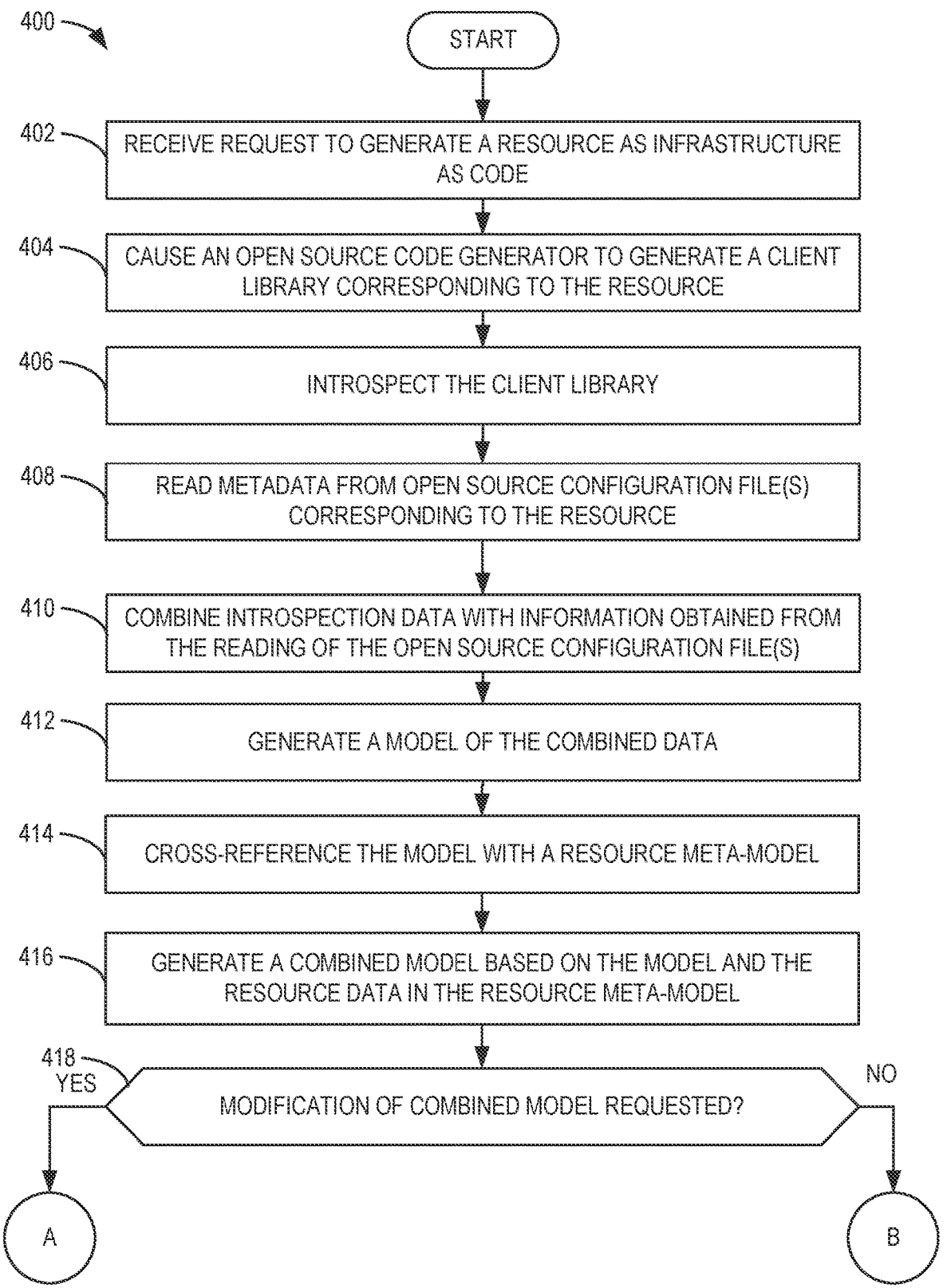
FIGS. 4A and 4B, collectively
Figure 4B:
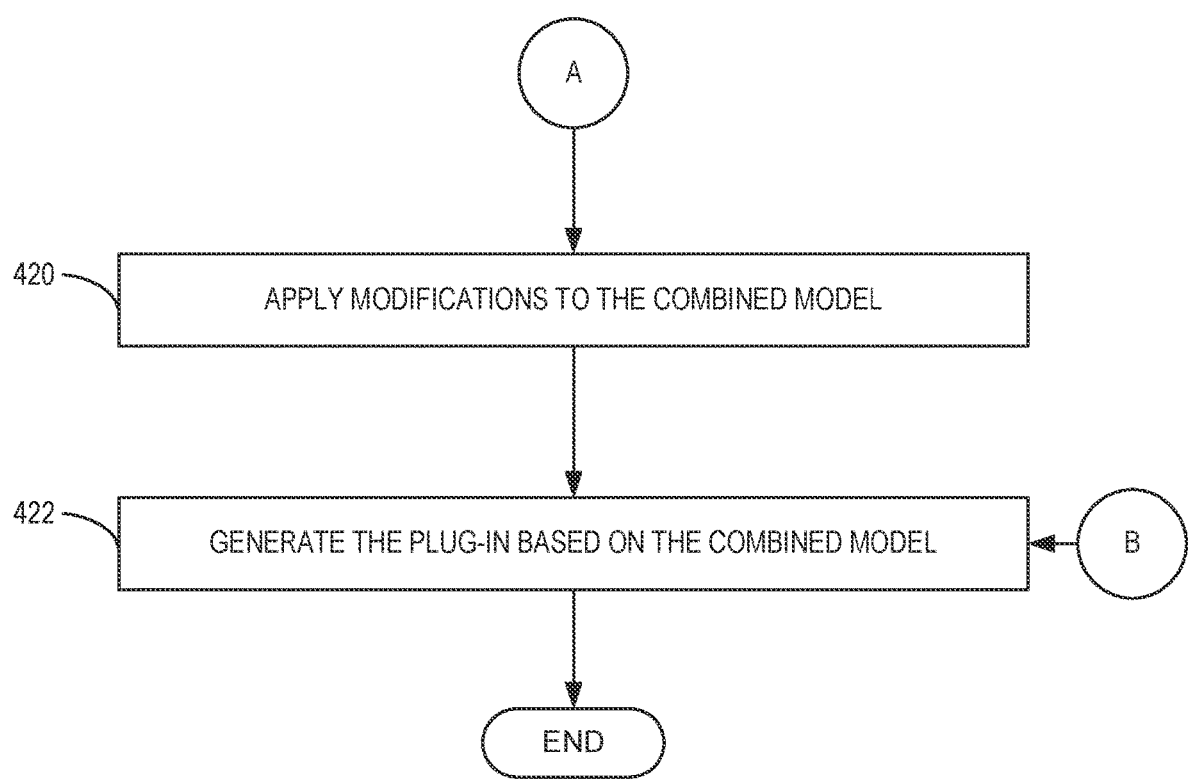

Flowcharts representative of example machine readable instructions, which may be executed to configure processor circuitry to implement the plug-in generation circuitry 114 of FIGS. 1-3, are shown in FIGS. 4A and 4B. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4A and 4B, many other methods of implementing the example plug-in generation circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4A and 4B may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 4A and 4B are flowcharts representative of example machine readable instructions and/or example operations 400 that may be executed and/or instantiated by processor circuitry to generate domain-specific code as a plug-in. The machine readable instructions and/or the operations 400 begins at block 402 (FIG. 4A), at which the example plug-in generation circuitry 114 receives a request to generate a resource as infrastructure as code. For example, the interface circuitry 202 (FIG. 2) may obtain instructions to generate a VM, a VPC, provision a data center, etc.

The example plug-in generation circuitry 114 causes an open source code generator to generate a client library corresponding to the resource (block 404). For example, the interface circuitry 202 notifies an open source code generator (e.g., the client library generator 306 of FIG. 3) to generate executable code as a client libraries 110 (FIG. 1) based on formal definitions of an API corresponding to the resource. In some examples, such formal definitions of the API are found in open source configuration files (e.g., the open source configuration files 308 of FIG. 3).

The example plug-in generation circuitry 114 introspects the client library (block 406). For example, the introspection circuitry 204 (FIG. 2) extracts introspection data (e.g., the introspection data 214 of FIG. 2) from the client libraries 110 to determine how the code works, the main functions of the code, etc., determine where the introspection data (e.g., the introspection data 214 of FIG. 2) is, and determine one or more characteristics of the code. In some examples, the introspection circuitry 204 executes the code to extract the introspection data. In some examples, the introspection circuitry 204 utilizes a language construct traversal mechanism to allow procedural code processing of any language-specific code.

The example plug-in generation circuitry 114 reads metadata from the open source configuration file(s) corresponding to the resource (block 408). For example, the model generation circuitry 206 (FIG. 2) reads and extracts metadata from open source files (e.g., the open source configuration file(s) 308 of FIG. 3) that were used to create the executable code in the client libraries 110. In some examples, the metadata enriches and/or supplements the introspection data.

The example plug-in generation circuitry 114 combines the introspection data (e.g., the introspection data 214 of FIG. 2) with information obtained from the reading of the open source configuration file(s) (block 410). For example, the model generation circuitry 206 enriches and/or supplements the introspection data (e.g., the introspection data 214 of FIG. 2) with the metadata.

The example plug-in generation circuitry 114 generates a model of the combined data (block 412). For example, the model generation circuitry 206 uses the combined data to generate an abstract representation of the programmatic sequence (e.g., an API call sequence) for creating, reading, updating or deleting the infrastructure definitions. Therefore, the model (e.g., the initial model(s) 216 of FIG. 2) includes simplified code indicative of how to generate the desired cloud infrastructure. Alternatively, the example model generation circuitry 206 generates the model (e.g., the initial model(s) 216 of FIG. 2) based on the introspection data and does not use metadata from the open source configuration file(s) (e.g., the open source configuration file(s) 308 of FIG. 3). For example, when there is no further information to be retrieved from the open source configuration file(s), the model generation circuitry 206 generates the model without the metadata.

The example plug-in generation circuitry 114 cross-references the model with a resource meta-model (block 414). For example, the model generation circuitry 206 uses the resource meta-model (e.g., resource meta-model 312 of FIG. 3) to enforce a desired state on the resource. For example, the resource meta-model (e.g., the resource meta-model 312 of FIG. 3) describes operations (e.g., create resource, read the resource, update the resource, delete the resource) of the resource that an open source configuration file nor the client library describes, and can be utilized to create, read, update, or delete the resource. In some examples, the model generation circuitry 206 uses the resource meta-model (e.g., the resource meta-model 312 of FIG. 3) to add support for other existing resources and their corresponding desired states to the model (e.g., the initial model(s) 216 of FIG. 2). For example, the model generation circuitry 206 ensures that the desired state of the requested resource works in conjunction with the existing resources in the cloud infrastructure (e.g., cloud infrastructure 102 of FIG. 1).

The example plug-in generation circuitry 114 generates a combined model based on the model and the resource data in the resource meta-model (block 416). For example, the model generation circuitry 206 updates the model with the resource data corresponding to operations of the resource and the desired operations (e.g., desired states) of the existing resources.

The example plug-in generation circuitry 114 determines whether a modification of the combined model has been requested (block 418). For example, the modification circuitry 208 (FIG. 2) determines whether any resource override inputs have been received.

If the example plug-in generation circuitry 114 determines that a modification has been requested (e.g., block 418: YES), the example plug-in generation circuitry 114 applies the modifications to the combined model 218 (block 420). For example, the modification circuitry 208 overrides resource states in the combined model 218 based on the inputs received from developers. In such examples, overriding resource states modifies the combined model 218 by changing property values assigned to the resource in the combined model 218.

After applying the modifications to the combined model 218 at block 420, or if the plug-in generation circuitry 114 determines that a modification has not been requested (e.g., block 418: NO), the example plug-in generation circuitry 114 generates the plug-in based on the combined model 218 (block 422). For example, the IaC code generation circuitry 210 (FIG. 2) produces code in the combined model (which may have been modified at block 402) as a module or as a library. In such examples, the module or library is a plug-in 116 that extends the behavior of the cloud infrastructure (e.g., the cloud infrastructure 102 of FIG. 1) and is consumable by an IaC managing system (e.g., the IaC managing circuitry 106 of FIG. 1).

Returning briefly to block 418, the example plug-in generation circuitry 114 may determine that a modification has not been requested (e.g., block 418: NO) when developers do not request to override the resource states, parameters, properties, etc., in the combined model 218. In such examples, the combined model 218 generated at block 416 is the final code that is used by the IaC code generation circuitry 210 at block 422 to produce a plug-in (e.g., the plug-in(s) 116 of FIGS. 1 and 2 and/or the IaC plug-in 304 of FIG. 3).

The example instructions and/or operations 400 end. In some examples, the instructions and/or operations 400 can be repeated when the plug-in generation circuitry 114 obtains a request to generate a resource as infrastructure as code.

Figure 5:
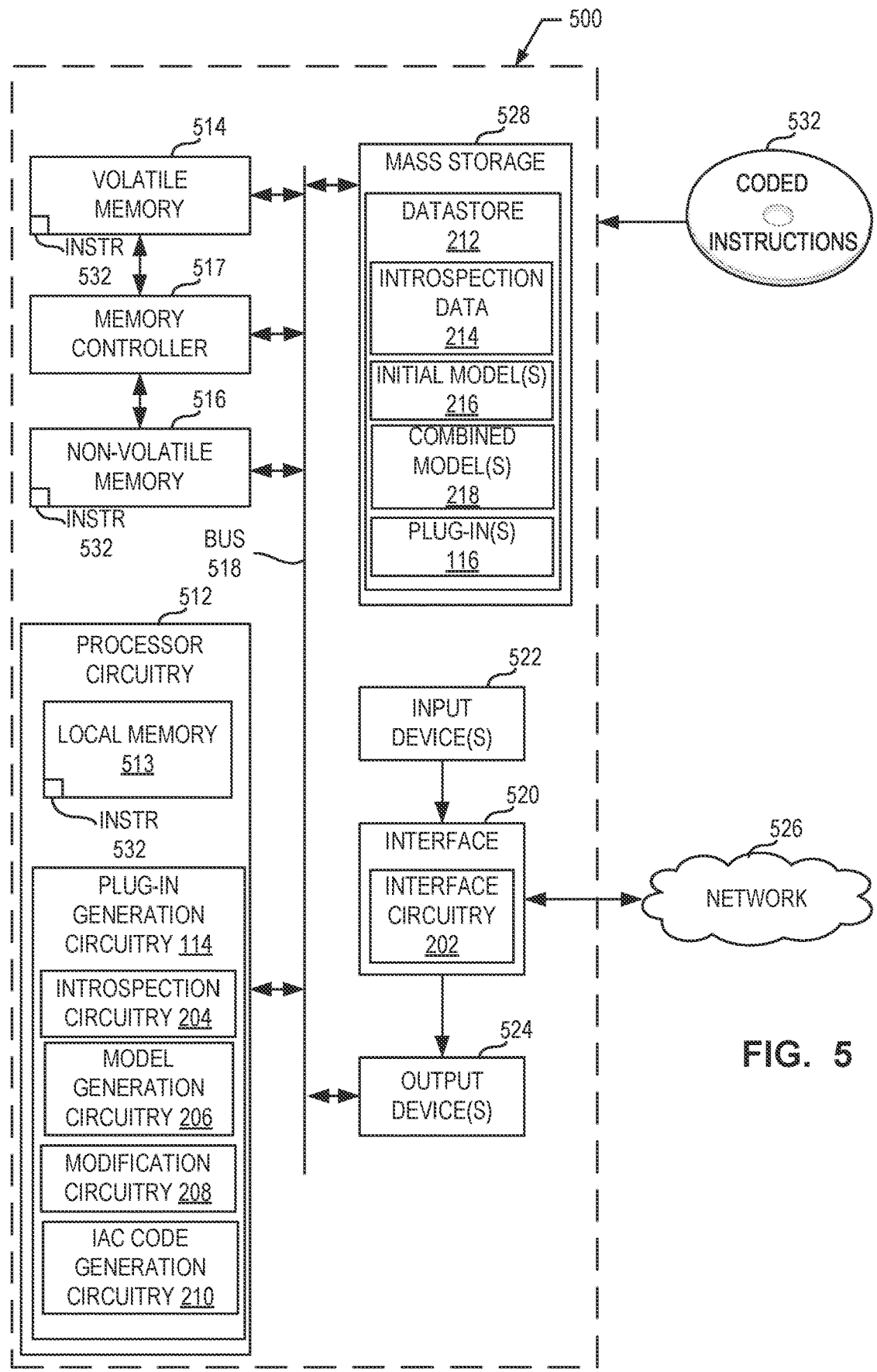
FIG. 5 is a block diagram of an example processing platform including processor circuitry structured to execute the example machine readable instructions and/or the example operations of FIG. 3 to implement the plug-in generation circuitry of FIGS. 1 and 2.

FIG. 5 is a block diagram of an example processor platform 500 structured to execute and/or instantiate the machine readable instructions and/or the operations of FIGS. 4A and 4B to implement the plug-in generation circuitry 114 of FIGS. 1-3. The processor platform 500 can be, for example, a server, a personal computer, a workstation, a self-learning machine (e.g., a neural network), a mobile device (e.g., a cell phone, a smart phone, a tablet such as an iPad™), or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. In some examples, the processor platform 500 may be used to instantiate one or more logical processors to implement examples disclosed herein. Examples of such logical processors include emulated processors that run on a hardware abstraction layer (HAL) and/or virtual processors virtualized by a hypervisor. As such, examples disclosed herein may be implemented by one or more physical processors (e.g., the processor circuitry 512) and/or by one or more logical processors instantiated on the physical processor circuitry 512. The processor circuitry 512 may be implemented by one or more semiconductor based (e.g., silicon based) devices. In this example, the processor circuitry 512 implements the example introspection circuitry 204, the example model generation circuitry 206, the example modification circuitry 208, and the example IaC code generation circuitry 210 of FIG. 2.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 520 implements the example interface circuitry 202 of FIG. 2.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, and/or an in-place switching (IPS) display, a touchscreen, etc.). The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage devices 528 implement the example datastore 212 to store the example introspection data 214, the example initial model(s) 216, the example combined model(s) 218, and the example plug-in(s) 116.

The machine readable instructions 532, which may be implemented by the machine readable instructions of FIGS.

4A and 4B, may be stored in the mass storage device 528, in the volatile memory 514, in the non-volatile memory 516, and/or on a removable non-transitory computer readable storage medium such as a CD or DVD.

Figure 6:
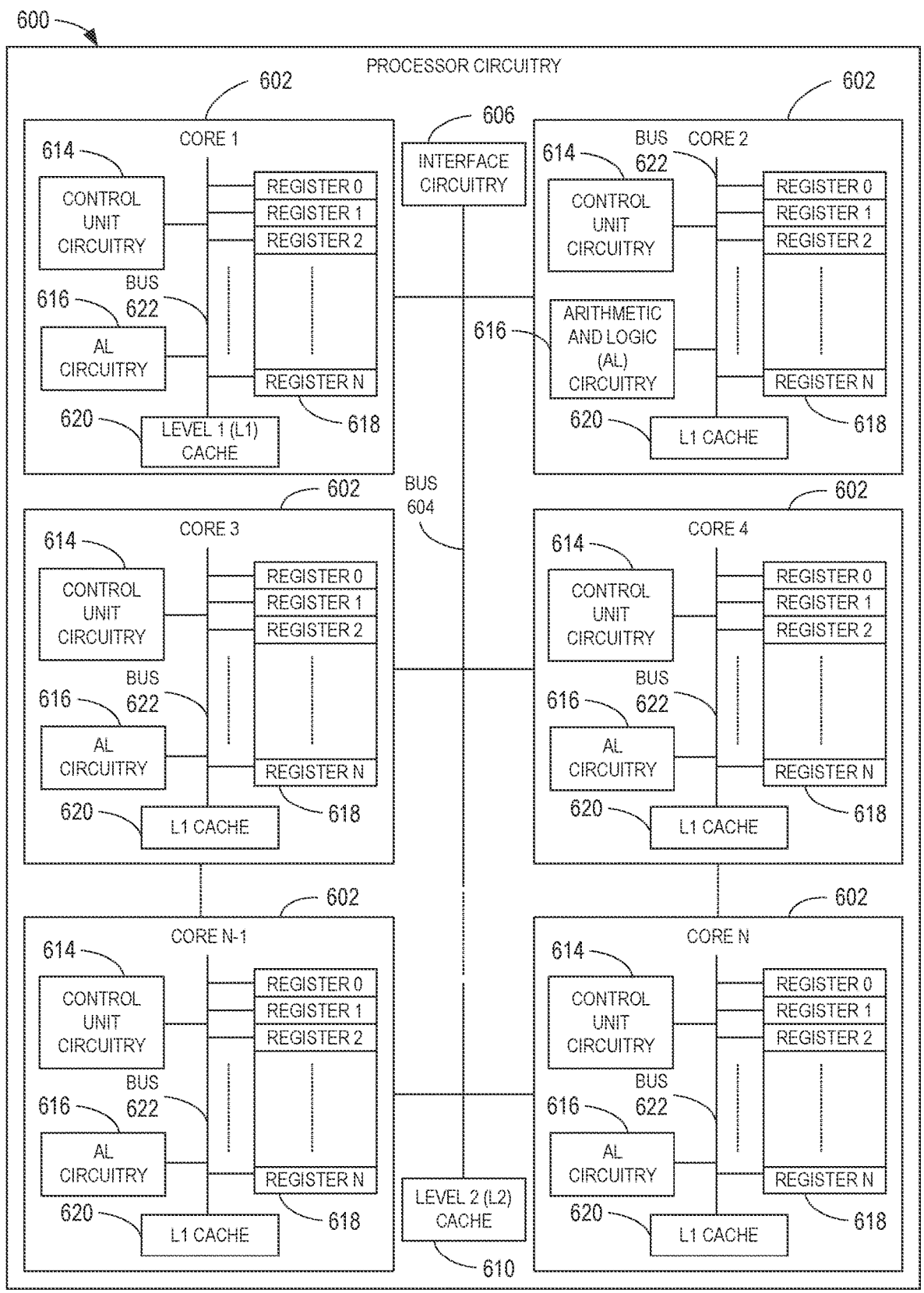
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowcharts of FIGS. 4A and 4B to effectively instantiate the plug-in generation circuitry 114 of FIGS. 1-3 as logic circuits to perform the operations corresponding to those machine readable instructions. In some such examples, the plug-in generation circuitry 114 of FIGS. 1-3 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 4A and 4B.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
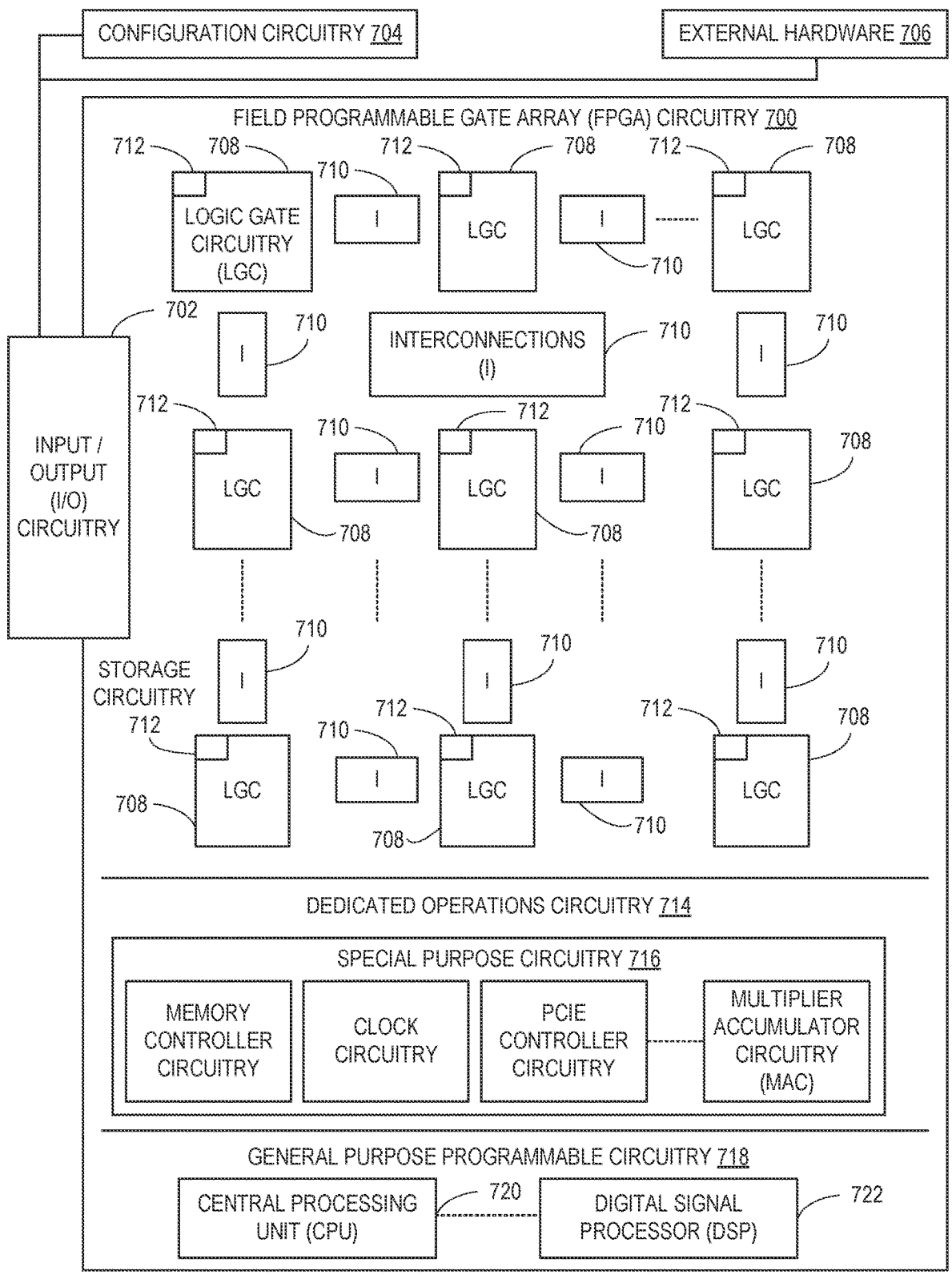
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 4A and 4B but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 4A and 4B. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 4A and 4B. As such, the FPGA circuitry 700 may be structured to effectively instantiate some or all of the machine readable instructions of the flowcharts of FIGS. 4A and 4B as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 4A and 4B faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 4A and 4B and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 6 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIGS. 4A and 4B may be executed by one or more of the cores 602 of FIG. 6, a second portion of the machine readable instructions represented by the flowcharts of FIGS. 4A and 4B may be executed by the FPGA circuitry 700 of FIG. 6, and/or a third portion of the machine readable instructions represented by the flowcharts of FIGS. 4A and 4B may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
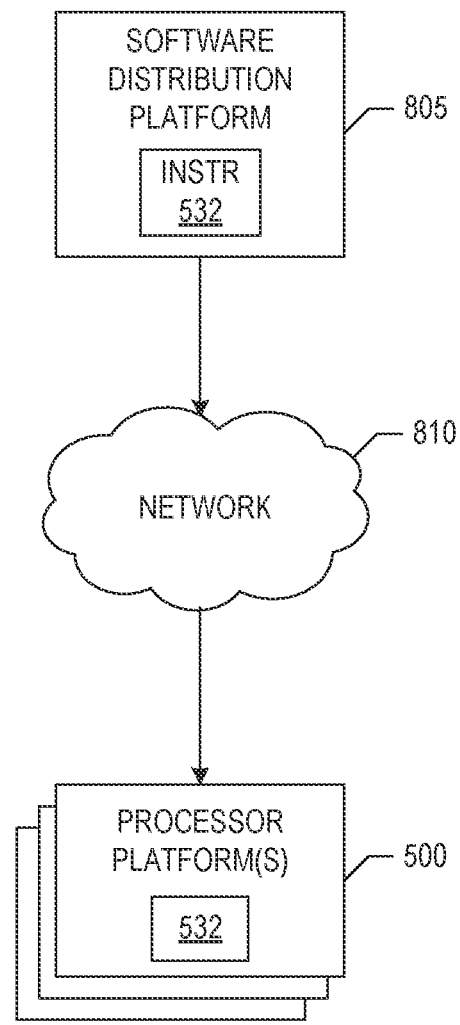
FIG. 8 is a block diagram of an example software distribution platform (e.g., one or more servers) to distribute software (e.g., software corresponding to the example machine readable instructions of FIGS. 4A and 4B) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 400 of FIGS. 4A and 4B, as described above. The one or more servers of the example software distribution platform 805 are in communication with an example network 810, which may correspond to any one or more of the Internet and/or any of the example networks 526, described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 400 of FIGS. 4A and 4B, may be downloaded to the example processor platform 500, which is to execute the machine readable instructions 532 to implement the plug-in generation circuitry 114 of FIGS. 1-3. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that generate code as a plug-in for IaC systems. Disclosed systems, methods, apparatus, and articles of manufacture improve the efficiency of using a computing device when a computing device consumes the code to generate a cloud infrastructure by not requiring excess computation cycles to identify runtime errors in the code. For example, examples disclosed herein identify and correct runtime errors during the development of the plug-in and, thus, prior to application of the code by an IaC system. Additionally, systems, methods, apparatus, and articles of manufacture improve the efficiency of a developer using a computing device by providing a mechanism to extend open source modules to be resource-specific without the need to manually modify the code in the open source modules. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate code as a plug-in in a cloud computing environment are disclosed herein. Further examples and combinations thereof include the following:

Example 1 includes a system comprising at least one memory, programmable circuitry, and machine readable instructions to program the programmable circuitry to introspect code in a library to obtain introspection data, the library corresponding to a resource that is to be deployed in a cloud infrastructure environment, generate a model based on the introspection data, the model to be a representation of the resource, cross-reference the model with a resource meta-model, the resource meta-model to map characteristics of the resource represented by the model to an actual state of the resource, and generate a plug-in based on the cross-referenced model.

Example 2 includes the system of example 1, wherein the programmable circuitry is to read metadata from at least one configuration file corresponding to the resource, the metadata to supplement the model.

Example 3 includes the system of example 1, wherein the programmable circuitry is to execute the code to introspect the code, and identify a syntax error in the code.

Example 4 includes the system of example 3, wherein the programmable circuitry is to correct the syntax error before generation of the model.

Example 5 includes the system of example 1, wherein the programmable circuitry is to obtain a request to modify the cross-referenced model, and apply the modification to the cross-referenced model.

Example 6 includes the system of example 5, wherein the modification is an override of a state of the resource.

Example 7 includes the system of example 1, wherein the programmable circuitry is to utilize a tree traversal algorithm to introspect the code and generate a representation of the code.

Example 8 includes a non-transitory machine readable storage medium comprising instructions to cause programmable circuitry to at least introspect code in a library to obtain introspection data, the library corresponding to a resource that is to be deployed in a cloud infrastructure environment, generate a model based on the introspection data, the model to be a representation of the resource, cross-reference the model with a resource meta-model, the resource meta-model to map characteristics of the resource represented by the model to an actual state of the resource, and generate a plug-in based on the cross-referenced model.

Example 9 includes the non-transitory machine readable storage medium of example 8, wherein the instructions are to cause the programmable circuitry to read metadata from at least one configuration file corresponding to the resource, the metadata to supplement the model.

Example 10 includes the non-transitory machine readable storage medium of example 8, wherein the instructions are to cause the programmable circuitry to execute the code to introspect the code, and identify a syntax error in the code.

Example 11 includes the non-transitory machine readable storage medium of example 10, wherein the instructions are to cause the programmable circuitry to correct the syntax error before generation of the model.

Example 12 includes the non-transitory machine readable storage medium of example 8, wherein the instructions are to cause the programmable circuitry to obtain a request to modify the cross-referenced model, and apply the modification to the cross-referenced model.

Example 13 includes the non-transitory machine readable storage medium of example 12, wherein the modification is an override of a state of the resource.

Example 14 includes the non-transitory machine readable storage medium of example 8, wherein the instructions are to cause the programmable circuitry to execute a tree traversal algorithm to introspect the code and generate a representation of the code.

Example 15 includes a method comprising Introspecting, by executing an instruction with programmable circuitry, code in a library to obtain introspection data, the library corresponding to a resource that is to be deployed in a cloud infrastructure environment, generating, by executing an instruction with the programmable circuitry, a model based on the introspection data, the model to be a representation of the resource, cross-referencing, by executing an instruction with the programmable circuitry, the model with a resource meta-model, the resource meta-model to map characteristics of the resource represented by the model to an actual state of the resource, and generating, by executing an instruction with the programmable circuitry, a plug-in based on the cross-referenced model.

Example 16 includes the method of example 15, further including reading metadata from at least one configuration file corresponding to the resource, the metadata to supplement the model.

Example 17 includes the method of example 15, further including executing the code to introspect the code, and identifying a syntax error in the code.

Example 18 includes the method of example 17, further including correcting the syntax error before generation of the model.

Example 19 includes the method of example 15, further including obtaining a request to modify the cross-referenced model, and applying the modification to the cross-referenced model.

Example 20 includes the method of example 19, wherein the modification is an override of a state of the resource.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system comprising:
   at least one memory;
   programmable circuitry; and
   machine readable instructions to program the programmable circuitry to:
   introspect code in a library to obtain introspection data, the library corresponding to a resource that is to be deployed in a cloud infrastructure environment;
   generate a model based on the introspection data, the model to be a representation of the resource;
   cross-reference the model with a resource meta-model, the resource meta-model to map characteristics of the resource represented by the model to an actual state of the resource; and
   generate a plug-in based on the cross-referenced model.

2. The system of claim 1, wherein the programmable circuitry is to read metadata from at least one configuration file corresponding to the resource, the metadata to supplement the model.

3. The system of claim 1, wherein the programmable circuitry is to:
   execute the code to introspect the code; and
   identify a syntax error in the code.

4. The system of claim 3, wherein the programmable circuitry is to correct the syntax error before generation of the model.

5. The system of claim 1, wherein the programmable circuitry is to:
   obtain a request to modify the cross-referenced model; and
   apply the modification to the cross-referenced model.

6. The system of claim 5, wherein the modification is an override of a state of the resource.

7. The system of claim 1, wherein the programmable circuitry is to utilize a tree traversal algorithm to introspect the code and generate a representation of the code.

8. A non-transitory machine readable storage medium comprising instructions to cause programmable circuitry to at least:
   introspect code in a library to obtain introspection data, the library corresponding to a resource that is to be deployed in a cloud infrastructure environment;
   generate a model based on the introspection data, the model to be a representation of the resource;
   cross-reference the model with a resource meta-model, the resource meta-model to map characteristics of the resource represented by the model to an actual state of the resource; and
   generate a plug-in based on the cross-referenced model.

9. The non-transitory machine readable storage medium of claim 8, wherein the instructions are to cause the programmable circuitry to read metadata from at least one configuration file corresponding to the resource, the metadata to supplement the model.

10. The non-transitory machine readable storage medium of claim 8, wherein the instructions are to cause the programmable circuitry to:
    execute the code to introspect the code; and
    identify a syntax error in the code.

11. The non-transitory machine readable storage medium of claim 10, wherein the instructions are to cause the programmable circuitry to correct the syntax error before generation of the model.

12. The non-transitory machine readable storage medium of claim 8, wherein the instructions are to cause the programmable circuitry to:
    obtain a request to modify the cross-referenced model; and
    apply the modification to the cross-referenced model.

13. The non-transitory machine readable storage medium of claim 12, wherein the modification is an override of a state of the resource.

14. The non-transitory machine readable storage medium of claim 8, wherein the instructions are to cause the programmable circuitry to execute a tree traversal algorithm to introspect the code and generate a representation of the code.

15. A method comprising:

Introspecting, by executing an instruction with programmable circuitry, code in a library to obtain introspection data, the library corresponding to a resource that is to be deployed in a cloud infrastructure environment;

generating, by executing an instruction with the programmable circuitry, a model based on the introspection data, the model to be a representation of the resource;

cross-referencing, by executing an instruction with the programmable circuitry, the model with a resource meta-model, the resource meta-model to map characteristics of the resource represented by the model to an actual state of the resource; and generating, by executing an instruction with the programmable circuitry, a plug-in based on the cross-referenced model.

16. The method of claim 15, further including reading metadata from at least one configuration file corresponding to the resource, the metadata to supplement the model.

17. The method of claim 15, further including:

executing the code to introspect the code; and identifying a syntax error in the code.

18. The method of claim 17, further including correcting the syntax error before generation of the model.

19. The method of claim 15, further including:

obtaining a request to modify the cross-referenced model; and applying the modification to the cross-referenced model.

20. The method of claim 19, wherein the modification is an override of a state of the resource.

* * * * *